US006611736B1

(12) United States Patent
Waite et al.

(10) Patent No.: US 6,611,736 B1
(45) Date of Patent: Aug. 26, 2003

(54) EQUAL ORDER METHOD FOR FLUID FLOW SIMULATION

(75) Inventors: David Marc Waite, Coralville, IA (US); Shaupoh Wang, Chesterfield, MO (US); Jenn-Yeu Nieh, Chesterfield, MO (US)

(73) Assignee: AEMP Corporation, Jackson, TN (US)

( * ) Notice: Subject to any disclaimer, the term of this patent is extended or adjusted under 35 U.S.C. 154(b) by 464 days.

(21) Appl. No.: 09/610,641

(22) Filed: Jul. 1, 2000

(51) Int. Cl.$^7$ .................................................. G05D 9/00
(52) U.S. Cl. ................................ 700/281; 703/6; 703/2
(58) Field of Search ............................. 700/281; 703/9, 703/2, 6, 23

(56) References Cited

U.S. PATENT DOCUMENTS

| 3,840,364 A | 10/1974 | Flemings et al. ............... 75/63 |
| 3,842,895 A | 10/1974 | Mehrabian et al. ............ 164/49 |
| 3,902,544 A | 9/1975 | Flemings et al. .............. 164/71 |
| 3,948,650 A | 4/1976 | Flemings et al. .............. 75/135 |
| 3,951,651 A | 4/1976 | Mehrabian et al. ............ 75/135 |
| 4,089,680 A | 5/1978 | Flemings et al. .............. 75/129 |
| 4,108,643 A | 8/1978 | Flemings et al. .............. 75/135 |
| 4,125,364 A | 11/1978 | Stephens ...................... 432/145 |
| 4,174,214 A | 11/1979 | Bennett et al. ............. 75/168 R |
| 4,229,210 A | 10/1980 | Winter et al. ................... 75/10 |
| 4,345,637 A | 8/1982 | Flemings et al. ............ 164/113 |

(List continued on next page.)

FOREIGN PATENT DOCUMENTS

| EP | 0 701 002 A1 | 3/1996 | .............. C22C/1/00 |
| EP | 0710 515 A1 | 5/1996 | .............. B21K/1/00 |
| EP | 0 745 694 A1 | 12/1996 | .............. C22C/1/00 |
| EP | 0 841 406 A1 | 5/1998 | .............. C22C/1/00 |
| EP | 0 903 193 A1 | 3/1999 | .............. B22D/17/30 |
| WO | WO95/19237 | 7/1995 | .............. B22D/18/08 |
| WO | WO98/23403 | 6/1998 | .............. B22D/17/30 |
| WO | WO 98/30346 | 7/1998 | .............. B22D/11/04 |
| WO | WO99/50007 | 10/1999 | .............. B22D/17/30 |
| WO | WO00/05015 | 2/2000 | .............. B22D/17/08 |

OTHER PUBLICATIONS

Wang, S. P., et al., "A Net Inflow Method for Incompressible Viscous Flow with Moving Free Surfaces", Int. Jor. For Numerical Methods in Fluids, vol. 18, pp. 669–694. (1994).

Patankar, S.V., (1980) "Numerical Heat Transfer and Fluid Flow", Hemisphere Publishing Corporation, Washington, Chapter 6.

U.S. patent application Ser. No. 09/250,824, Norville et al., filed Feb. 17, 1999.

"Semisolid Metal Process Eliminates Preformed Billets", by Samuel D. Norville, *Die Casting Management*, Mar. 1998, pp. 31–33.

*Primary Examiner*—Leo Picard
*Assistant Examiner*—Zoila Cabrera
(74) *Attorney, Agent, or Firm*—Woodard, Emhardt, Moriarty, McNett & Henry LLP

(57) ABSTRACT

The present invention provides a method for solving the Navier-Stokes equation of viscous, incompressible laminar flows with moving free surfaces in complex domains. The method uses fixed mesh control volume-finite element techniques to track the flow. A gauss point velocity vector is defined as the average of its nodal counterpart, such that the gauss point velocity vector is constant over the element. The gauss point velocity vector is then inserted into the continuity constraint to form the Poisson pressure equation for solving the pressure field. The solution to the Poisson pressure equation is unique, the common checker-board problem is therefore eliminated. The corrected pressure field is substituted into the momentum equations, so that the resulting velocity field satisfies the continuity equation. Since velocity and pressure are evaluated at the same order, the global mass conservation can be evaluated to machine round-off tolerances.

20 Claims, 4 Drawing Sheets

U.S. PATENT DOCUMENTS

| | | | | |
|---|---|---|---|---|
| 4,415,374 | A | 11/1983 | Young et al. | 148/2 |
| 4,434,837 | A | 3/1984 | Winter et al. | 164/468 |
| 4,450,893 | A | 5/1984 | Winter et al. | 164/468 |
| 4,457,354 | A | 7/1984 | Dantzig et al. | 164/468 |
| 4,457,355 | A | 7/1984 | Winter et al. | 164/468 |
| 4,465,118 | A | 8/1984 | Dantzig et al. | 164/452 |
| 4,482,012 | A | 11/1984 | Young et al. | 165/146 |
| 4,494,461 | A | 1/1985 | Pryor et al. | 102/464 |
| 4,523,624 | A | 6/1985 | Dantzig et al. | 164/454 |
| 4,524,820 | A | 6/1985 | Gullotti et al. | 164/476 |
| 4,530,404 | A | 7/1985 | Vives | 164/467 |
| 4,534,003 | A | 8/1985 | Manzione | 700/200 |
| 4,555,272 | A | 11/1985 | Ashok et al. | 148/3 |
| 4,565,241 | A | 1/1986 | Young | 164/499 |
| 4,569,218 | A | 2/1986 | Baker et al. | 72/342 |
| 4,607,682 | A | 8/1986 | Dantzig et al. | 164/418 |
| RE32,529 | E | 10/1987 | Vives | 164/467 |
| 4,709,746 | A | 12/1987 | Young et al. | 164/485 |
| 4,712,413 | A | 12/1987 | Koch | 72/361 |
| 4,838,988 | A | 6/1989 | Lang et al. | 156/624 |
| 4,989,166 | A | 1/1991 | Akasaka et al. | 716/20 |
| 5,010,501 | A | 4/1991 | Arakawa | 345/420 |
| 5,031,108 | A | 7/1991 | Fujita et al. | 700/197 |
| 5,031,127 | A | 7/1991 | Fujita et al. | 700/197 |
| 5,219,018 | A | 6/1993 | Meyer | 164/468 |
| 5,227,979 | A | 7/1993 | Fukuhira et al. | 700/197 |
| 5,402,366 | A | 3/1995 | Kihara et al. | 703/9 |
| 5,432,718 | A | 7/1995 | Molvig et al. | 703/9 |
| 5,529,391 | A | 6/1996 | Kindman et al. | 366/145 |
| 5,553,206 | A | 9/1996 | Meshkat | 345/423 |
| 5,572,434 | A | 11/1996 | Wang et al. | 700/197 |
| 5,585,067 | A | 12/1996 | Leroy et al. | 420/554 |
| 5,630,466 | A | 5/1997 | Garat et al. | 164/457 |
| 5,701,942 | A | 12/1997 | Adachi et al. | 164/71.1 |
| 5,732,192 | A | 3/1998 | Malin et al. | 703/2 |
| 5,756,017 | A | 5/1998 | Togawa et al. | 264/40.1 |
| 5,801,969 | A | 9/1998 | Nagahama | 703/9 |
| 5,899,567 | A | 5/1999 | Morris, Jr. | 366/274 |
| 5,900,080 | A | 5/1999 | Baldi et al. | 148/550 |
| 5,912,823 | A | 6/1999 | Grant | 703/6 |
| 5,925,199 | A | 7/1999 | Shiina et al. | 148/538 |
| 5,940,309 | A * | 8/1999 | White et al. | 703/7 |
| 5,953,239 | A * | 9/1999 | Teixeira et al. | 703/6 |
| 6,009,741 | A * | 1/2000 | Wagner | 73/1.57 |
| 6,064,810 | A * | 5/2000 | Raad et al. | 703/23 |
| 6,089,744 | A * | 7/2000 | Chen et al. | 703/2 |
| 6,096,088 | A * | 8/2000 | Yu et al. | 703/9 |
| 6,480,190 | B1 * | 11/2002 | Pfister et al. | 345/419 |

* cited by examiner

EQUAL ORDER METHOD FOR FLUID FLOW SIMULATION

CROSS REFERENCE TO RELATED APPLICATIONS

The present application relates to a, and commonly owned U.S. Patent Application, entitled THERMAL FLOW SIMULATION FOR CASTING/MOLDING PROCESSES, Ser. No. 09/610,390 filed on even day herewith by the same inventive entity. The referenced application is incorporated herein by reference in its entirety.

FIELD OF THE INVENTION

This invention relates to a numerical method for solving the Navier-Strokes equation and has application in computer simulation of viscous, incompressible laminar fluid flow; in particular, it relates to a method using finite element-control volume techniques, wherein the velocity and pressure of the fluid are evaluated at the same order to preserve accuracy of solution without sacrificing computation efficiency.

BACKGROUND OF THE INVENTION

Modeling incompressible, viscous flow generally involves solving the Navier-Stokes equation to obtain the velocity field. The Navier-Stokes equation describes the fundamental law of mass conservation and momentum balance of incompressible viscous flow. For a given pressure field, there is no particular difficulty in solving the momentum equation. By substituting the correct pressure field into the momentum equation, the resulting velocity field satisfies the continuity constraint. The difficulties in calculating the velocity field lies when the pressure field is unknown. The pressure field is indirectly specified via the continuity equation. Yet, there is no obvious equation for obtaining pressure.

The difficulty associated with the determination of pressure has led to methods that eliminate pressure from the momentum equations. For example, in the well-known "stream-function/vorticity method" described by others and Gosman et. al. (In *Heat and Mass Transfer in Recirculating Flows*, Academic, New York, 1969.) The stream-function/vorticity method has some attractive features, but the pressure, which has been so cleverly eliminated, frequently happens to be a desired result or even an intermediate outcome required for the calculation of density and other fluid properties. In addition, the method cannot be easily extended to three-dimensional situations. Because most practical problems are three-dimensional, a method that is intrinsically restricted to two dimensions suffers from a serious limitation.

Numerical methods have been developed for solving the momentum equation and obtaining the pressure field. The SIMPLE (Semi-Implicit Method for Pressure-Linked Equations by Patenkar, in *Numerical Heat Transfer and Fluid Flow*, McGraw Hill, 1980), and SIMPLER (SIMPLE Revised) algorithms are well-known examples of the numerical methods. The SIMPLE and SIMPLER methods discretize the flow domain, and transform the momentum equation into a set of algebraic equations. The pressure-gradient term is represented in the discretized momentum equations by the pressure drop between two grid points. One consequence of this representation is the non-uniqueness of the solution of the pressure field. As long as the pressure values at alternate grid points are uniform, the discretized form of the momentum equations is incapable of distinguishing a checker-board pressure field from a uniform pressure field. However, the potential to result in a checkerboard pressure field should make the solution unacceptable. Another consequence of this representation is that pressure is, in effect, taken from a coarser grid than the one actually employed. This practice diminishes the accuracy of the solution. It has been recognized that the discretizing equation does not demand that all the variables be calculated on the same grid points. The SIMPLE and SIMPLER methods resolve the checker boarding of pressure by using a "staggered" grid for the velocity component. In the staggered grid, the velocity components are calculated on a grid staggered in relation to the normal control volume around the main grid points. A computer program based on the staggered grid must carry all the indexing and geometric information about the locations of the velocity components and must perform interpolation for values between grid points. Furthermore, a "staggered" grid is difficult to apply to a flow domain that is meshed into irregularly shaped finite elements.

Reduced order and reduced intergration methods have been suggested for modeling fluid flow in complex fluid domains. The reduced order method suggests that pressure be evaluated in a coarser grid, e.g. at alternate nodal positions of the finite element mesh (Baliga and Patankar, A Contol Volume Finite-Element Method for Two Dimensional Fluid Flows and Heat Transfer, in *Nutmerical Heat Transfer*, 6, 245–261 (1980)). The reduced order method diminishes the accuracy of the pressure field, and therefore compromises the accuracy of the subsequent mass flux calculations. Additionally, the method has been shown to be inadequate for modeling a fluid flow with a moving free surface. The reduced integration method suggests that less than full integration should be used for the pressure term. This method has shown some success in specific applications, but there are many limitations to its general application. Furthermore, reduced integration methods also sacrifice accuracy of the solution.

There is therefore a need for a method to solve the momentum equations of incompressive, viscous fluid flows such that accuracy of solution is preserved without sacrificing computation efficiency.

SUMMARY OF THE INVENTION

Accordingly, one preferred object of the present invention is to provide a numerical method for solving the Navier-Stokes equation of viscous incompressible, laminar fluid flow and wherein the velocity and pressure of the fluid are evaluated at the same order to preserve accuracy of solution without sacrificing computation efficiency.

Another preferred object of the present invention is to provide a numerical method for solving the momentum equation and providing a solution of such accuracy that the global mass conservation can be maintained to machine round-off tolerances.

One embodiment of the present invention is a numerical method for solving the coupled momentum and mass conservartion equation. The method resides and operates within a computer processor. The method defines a gauss point velocity vector as the average of the nodal velocity vectors. In essense, the expression of gauss point velocity vector is in the same order as the pressure gradient over each element. Because the gauss point fluxing vector field is "centered" inside the pressure field defined at the nodes, no checker boarding will occur. Additionally, because the gauss point velocities and pressure fields are evaluated from the same number of nodal positions, the accuracy of the solution is preserved. The predicted gauss point fluxing velocity field conserves mass to machine round-off levels for element types in which the pressure gradient and velocities can be evaluated on a consistent basis. In two dimensions, 3 noded, linear triangular elements will conserve mass to machine round-off tolerances. In three dimensions, 4 noded, linear tetrahedral elements will conserve mass to machine round-off tolerances.

One aspect of the present invention is to provide a numerical method operating within a processor environment for solving the momentum equation in a computer simulation of a viscous, incompressible, laminar flow within a flow domain comprising: (a) discretizing the flow domain into a mesh of elements having nodes and fluxing surfaces; (b) forming momentum equations; (c) computing nodal hat velocities at each node; (d) calculating gauss point hat velocities and gauss point coefficient, wherein the gauss point hat velocities and gauss point coefficient are average value of nodal hat velocities and nodal coefficient; (e) updating velocity field; and (f) checking if velocity field has converged, and returning to the forming momentum equation if the velocity field has not converged.

Other objects, embodiments, forms, aspects, features, advantages, and benefits will become apparent from the description and drawings provided herein.

DESCRIPTION OF THE PREFERRED EMBODIMENT

Figure 1:
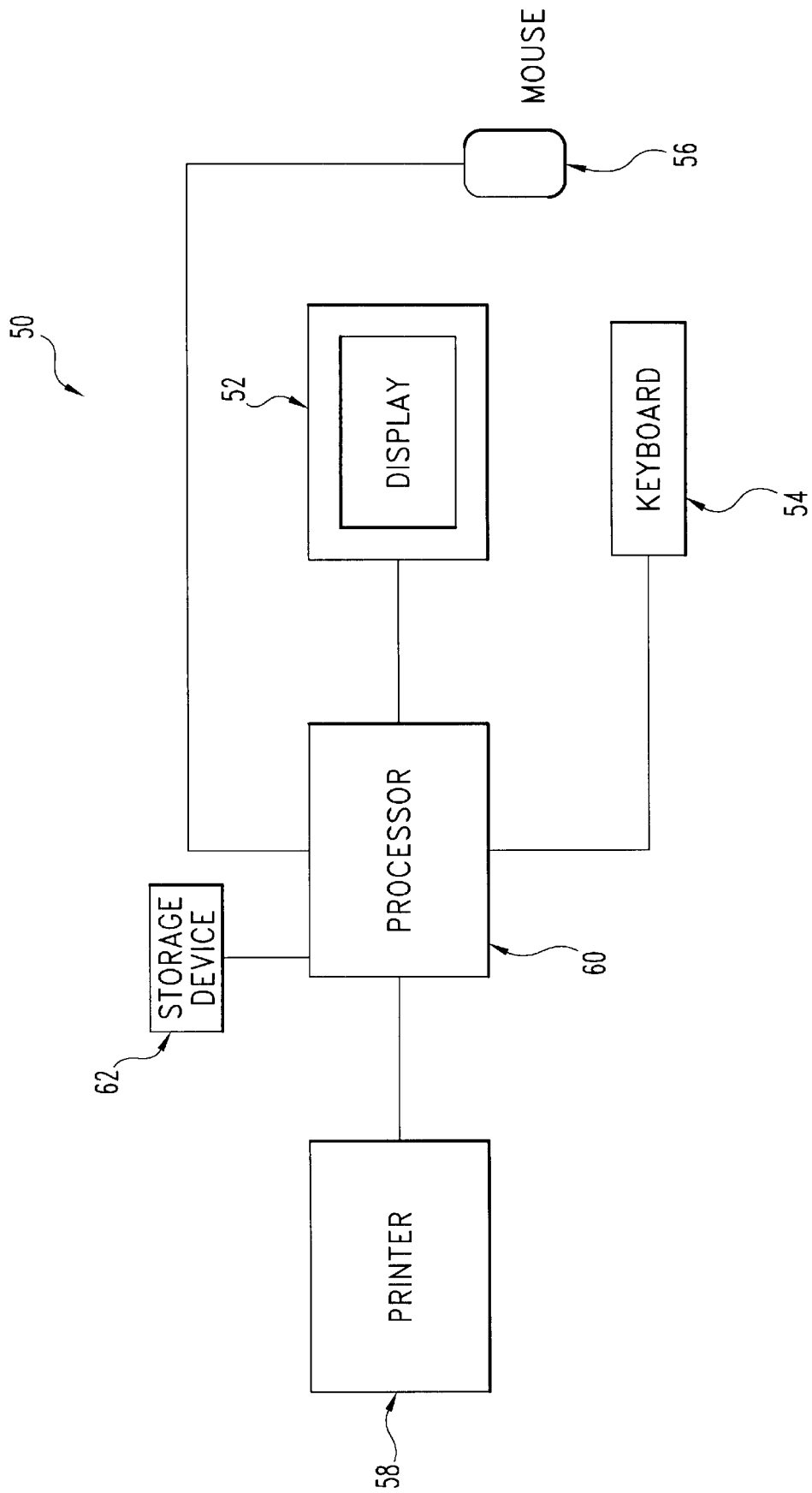
FIG. 1 is a schematic diagram of a machine to implement the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein being contemplated as would normally occur to one skilled in the art to which the invention relates are also included.

The illustrated embodiment of the present invention is a numerical method applicable for solving the momentum and mass conservation equations to obtain the velocity field and pressure distribution of incompressible fluid flow in a complex domain. The method can provide accurate solution that the global mass conservation can be maintained to the truncation limit of the computation device (machine round-off levels). An embodiment of the method is designed for incorporation in computer simulations of molten material flows.

The preferred embodiment of the present invention is designed to operate within a processor based computation device. Referring now to FIG. 1, there is shown an apparatus for carrying out the preferred embodiment of the invention. A conventional computer system 50, including a processor 60 including ROMs, RAMs, operatively connected by cables to a display 52, a keyboard 54, a mouse 56, a printer 58, and a storage device 62, though a variety of connection means and input and output devices may b e substituted without departing from the invention. Processor 60, in cooperation with an operation system, executes the codes of the present method, receives and stores data from the input devices, performs computations, and transmits data to the output devices. The illustrated embodiment of the method operates within a Silicon Graphic system using UNIX operating system. Other systems having similar computation capability, memory capacity and graphic displays can also be used.

The present invention is developed based on a discretized mesh of the flow domain. Any mesh may be employed, for example, a regular grid created according to the finite difference method or an irregular mesh created according to a finite element method. It is preferred that the grid can be split into uniquely defined control volumes and each of these control volumes can be associated with a unique node or grid point. It is also preferred that the flow domain is discretized into a finite element mesh. The irregular finite elements provide more flexibility in fitting irregular domains and in providing local grid refinement. In addition, the method is applicable to either moving or fixed finite element meshes. A fixed mesh is preferred.

Figure 2:
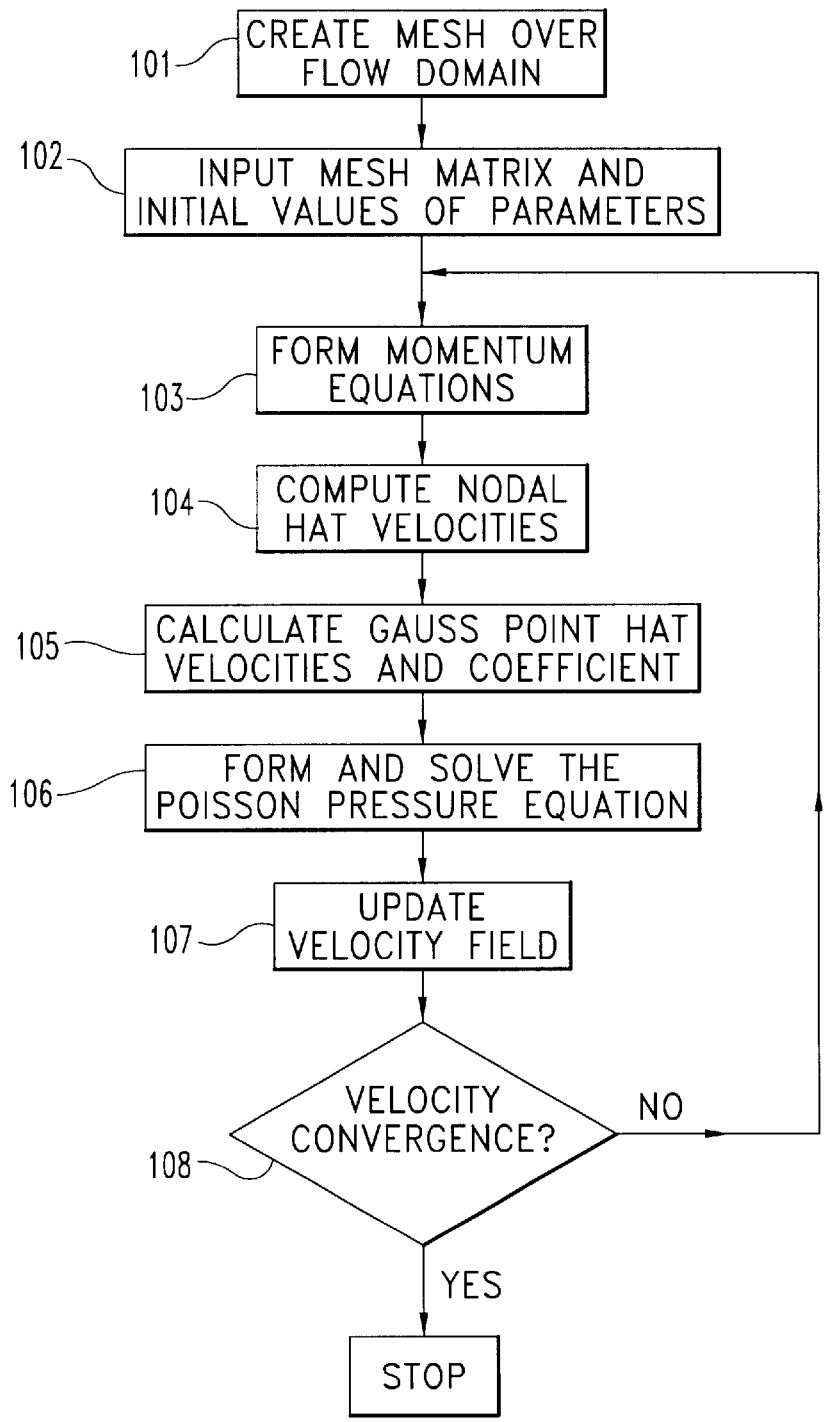
FIG. 2 is a flowchart schematically showing an embodiment of the method of the present invention.

Referring now to FIG. 2 which shows a flow-chart of an embodiment of the method of the present invention.

(a) Creation of the Finite Element Mesh, 101.

In 101, the flow domain is discretized or meshed into discrete control volumes to solve the governing equations. A finite element mesh of the flow domain may be created by any conventional procedures. For example, U.S. Pat. No. 5,010,501 issued on Apr. 24, 1991 to Arakawa and titled "Three-Dimensional Geometry Processing Method and Apparatus Therefor", and U.S. Pat. No. 5,553,206 issued on Sep. 3, 1996 to Meshkat and titled "Method and System for Producing Mesh Representations of Objects", both disclose suitable procedures.

Figure 3:
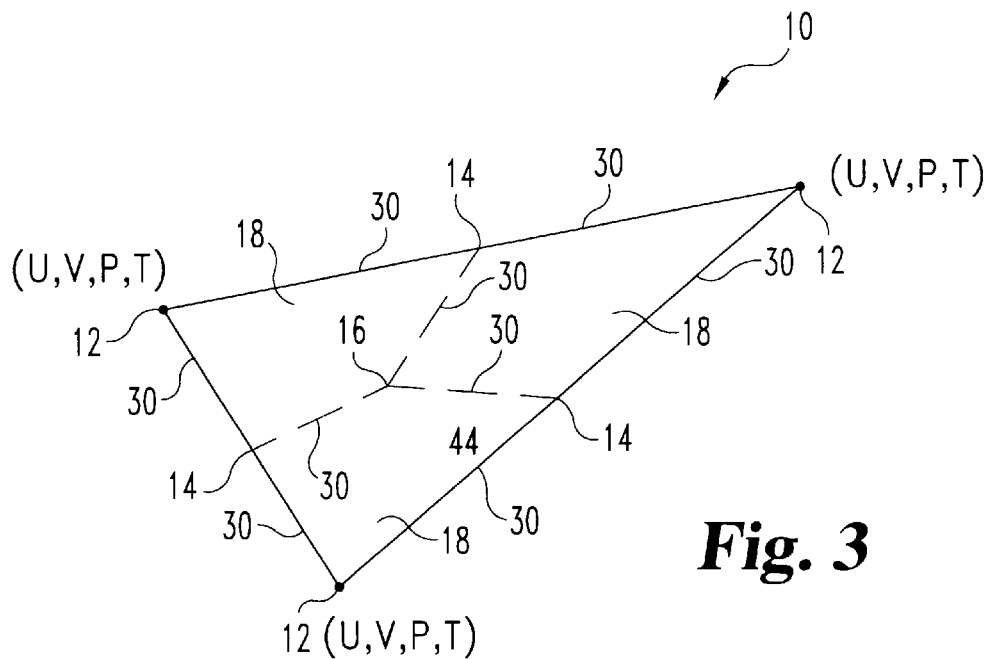
FIG. 3 is an example of a triangular finite element similar to those used in the illustrated embodiment of the method of the present invention.
Figure 4:
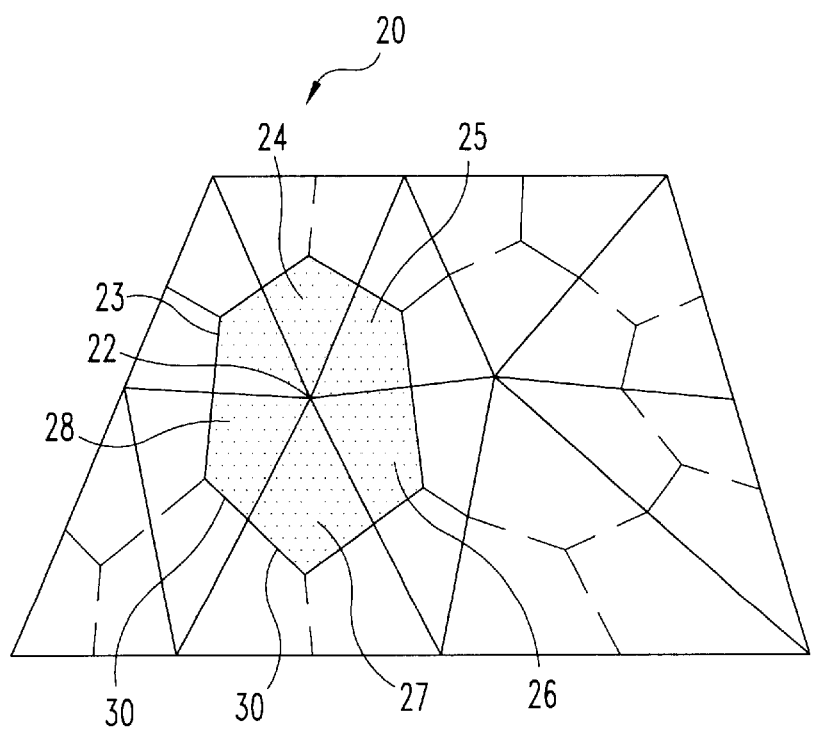
FIG. 4 is an example of a triangular finite element mesh including a control volume and associated sub-control volumes and fluxing surfaces, preferred by the illustrated embodiment of the method of the present invention.

The illustrated embodiment of the method is based on a mesh composed of a three-node, two dimensional, triangular finite element similar to that shown in FIG. 3 and 4. Referring now to FIG. 3, the triangle finite element 10 has three vertex nodes 12. Thermal physical parameters of the flow, e.g. temperature, velocity and pressures are evaluated at nodal (grid) points 12 of element 10. Particularly for this invention, gauss point fluxing vectors $P_g$ and $V_g$ are also computed.

Finite element 10 can be divided into three sub-control volumes (SCVs) 18 by joining the mid-side points 14 to the centroid 16. Each of sub-control volumes 18 is bounded by four fluxing surfaces 30 where material can flow from one sub-control volume to another. Typically, a number of sub-control volumes 18 surround a vertex node 12 and conveniently defines a control volume (CV) for that node. The sub-control volumes 18 that are attached to a particular node i, are collectively known as the control volume of node i. For example, as shown in FIG. 4, vertex node 22 is surrounded by six sub-control volumes 23–28 and the shaded area represents control volume 20 of vertex node 22. While it is illustrated that control volume 20 is defined by the six sub-control volumes 23–28 attached to vertex node 22, control volumes can be composed of one or more sub-control volumes depending on the geometry of the flow domain. For a given mesh, a flexible combination of the SCVs is much better than solely relying on CVs in defining the irregular shape of the free surface of the flowing fluid.

Figure 5:
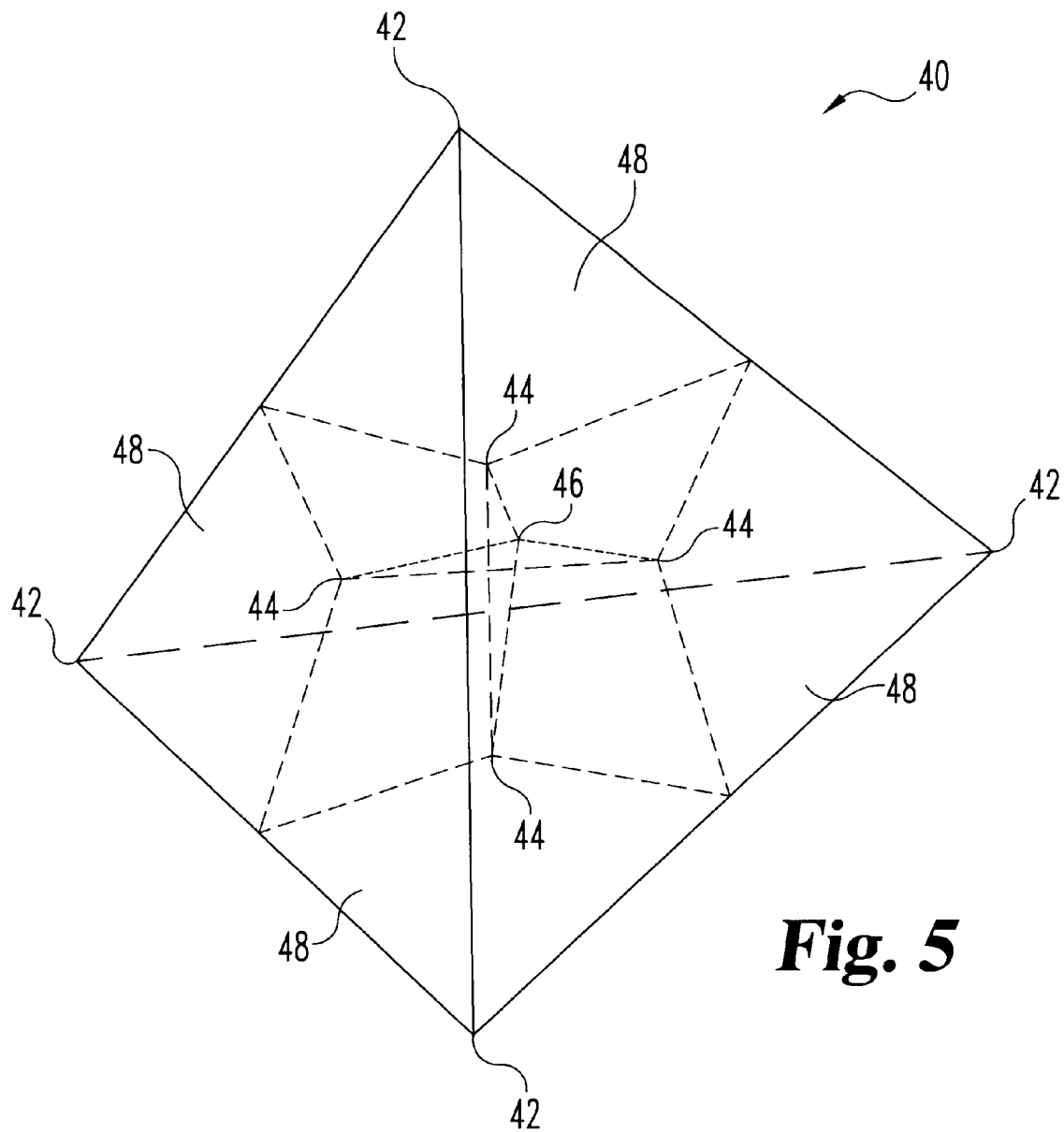
FIG. 5 is an example of a tetrahedral finite element preferred by an embodiment of the method of the present invention.

For modeling a three-dimensional problem, where a three dimensional finite would be required, a tetrahedral finite element is preferred. As shown in FIG. 5, tetrahedral element 40 has four vertex nodes 42 and four surfaces. Finite element 40 can be divided into four sub-control volumes (SCVs) 48 by joining the surface centroid 44 (centroid at each surface of the tetrahedral element 40) to the volume centroid 46 (the centroid of the tetrahedron). Each of the sub-control volumes 48 is a hexahedron having six fluxing surfaces.

While triangular and tetrahedral finite element are illustrated and preferred, it should be understood that other geometric shaped finite elements or a combination thereof might be used. It is also understood that linear finite elements are preferred but are not required.

(b) Inputting Initial Parameters, 102.

In 102, the finite element matrix, the properties of the fluid and initial values of variable parameters, e.g., temperature, pressure, density and velocities, are input. These values will be updated as the iterative computation progresses.

(c) Form Momentum Equations, 103.

The general equations governing the conservation of mass and momentum of the fluid flow can be expressed by equations (1)–(4)

Conservation of mass:

$$\frac{\partial \rho}{\partial \tau} + \frac{\partial (\rho u)}{\partial x} + \frac{\partial (\rho v)}{\partial y} + \frac{\partial (\rho w)}{\partial z} = 0 \tag{1}$$

Conservation of momentum:

$$\rho \frac{\partial u}{\partial \tau} + \rho (V \cdot \nabla u) = -\frac{\partial P}{\partial x} + \rho g_x + \nabla (\mu \nabla u) \tag{2}$$

$$\rho \frac{\partial v}{\partial \tau} + \rho (V \cdot \nabla v) = -\frac{\partial P}{\partial y} + \rho g_y + \nabla (\mu \nabla v) \tag{3}$$

$$\rho \frac{\partial w}{\partial \tau} + \rho (V \cdot \nabla w) = -\frac{\partial P}{\partial z} + \rho g_z + \nabla (\mu \nabla w) \tag{4}$$

where:
x, y, z=cartesian coordinate variables
u, v, w=magnitude of the velocity vector V in the x-, y-, and z-directions, respectively,
$\tau$=time
$\rho$=density
P=pressure
V=flow velocity vector
$\mu$=viscosity
$g_x$, $g_y$, $g_z$=magnitude of gravity in the x-, y-, and z-directions, respectively.

The momentum equations (2)–(4) above describes the fundamental conservation law of incompressible viscous flow. Equations (2)–(4) are made up of several terms each representing a physical phenomenon pertaining to fluid flow. Examples of the terms include inertia, advection, diffusion, body force and pressure gradient. Generally, the terms pertinent to the problem being solved are selected and the remaining terms are grouped and collectively defined as the source term. Using control volume techniques, an elemental matrix can be computed to approximate the terms of interest.

These matrices are then assembled into a global momentum matrix (discretization equations) to be solved iteratively.

The Galerkin method and also Schneider and Zedan ("Control-Volume-Based Finite Element Formulation of the Heat Conduction Equations", *Progress in Astronomical and Aeronautical Engineering*, Vol. 86, pp. 305–327, 1983) have demonstrated the procedure for derivation of the discretized equation for a finite element mesh. In both derivations, a "shaped function" or profile assumption is used to describe how a dependent variable varies over an element.

In assembling the global matrix of the illustrated embodiment of the present invention, the methodology presented by Schneider and Zedan is followed. However, any other method for forming a global matrix may be used. In the illustrated embodiment, the terms for advection, diffusion, and a pressure gradient are selected. Each term is integrated over a sub-control volume (e.g. 18 of FIG. 3) and then assembled to form global equations. If the integrand is considered constant, then equation (5) results as follows:

$$\int_v c\, dV = cV \tag{5}$$

For the advection terms, a streamlined upwind operator is used, as represented by the following equation (6):

$$\int_v \left[u\frac{\partial \phi}{\partial x} + v\frac{\partial \phi}{\partial y} + w\frac{\partial \phi}{\partial z}\right] dV = \int_v \left[u_s \frac{\partial \phi}{\partial s}\right] dV = u_s V \frac{\Delta \phi}{\Delta s} \tag{6}$$

where $\phi$ is any dependent variable, S is distance along a streamline, subscript v denotes volume and subscript s denotes streamline function.

For the diffusion terms, Green's theorem is used to convert the volume integral to an integration of fluxes through the bounding surface, as modeled by equation (7):

$$\int_v \nabla \alpha \nabla \phi \, dV = \int_\sigma \alpha \nabla \phi \cdot d\omega = \int_\sigma J \cdot d\omega \tag{7}$$

where $\sigma$, v denote surface and volume integral, respectively, and $\phi$ is any dependent variable and J is the flux contribution. The flux contribution for a face j from a node i, is expressed by equation (8) as follows:

$$J_{ij} = \alpha \left[ \frac{\partial N_i}{\partial r}(a_{11}\omega_{xj} + a_{21}\omega_{yj} + a_{31}\omega_{zj}) + \right. \tag{8}$$

$$\frac{\partial N_i}{\partial t}(a_{13}\omega_{xj} + a_{23}\omega_{yj} + a_{33}\omega_{zj}) +$$

$$\left. \frac{\partial N_i}{\partial s}(a_{12}\omega_{xj} + a_{22}\omega_{yj} + a_{32}\omega_{zj}) \right]$$

where:

$N_i$ is the shape function, $a_{11}$–$a_{33}$ are the cofactors of the Jacobian matrix, and $\omega_{xj}$, $\omega_{yj}$, $\omega_{zj}$ are the components of the area $\omega$, and $\alpha$ is diffusivity.

After the assembly process, each term at the left-hand side of the momentum equations is represented by a coefficient matrix operating on a velocity component. The resulting assembled global momentum equations can be modeled by equations (9) and (10) as follows $$\sum_{j=1}^{N} a_{ij} u_j = -\int_A \frac{\partial P}{\partial x} dA \quad (9)$$

$$\sum_{j=1}^{N} a_{ij} v_j = -\int_A \frac{\partial P}{\partial y} dA \quad (10)$$

where the $a_{ij}$ terms make up the influence coefficient matrix. Pulling the pressure gradients outside the area integrals, equations (9) and (10) is recast as equations (11)–(15) as follows:

$$u_i = \hat{u}_i - K_i \frac{\partial P}{\partial x} \quad (11)$$

and $$v_i = \hat{v}_i - K_i \frac{\partial P}{\partial y} \quad (12)$$

where, $$K_i = \frac{1}{a_{ii}} \int dA, \quad (13)$$

$$\hat{u}_i = -\frac{1}{a_{ii}} \sum_{i \neq j} a_{ij} u_j, \quad (14)$$

and $$\hat{v}_i = -\frac{1}{a_{ii}} \sum_{i \neq j} a_{ij} v_j \quad (15)$$

and nodal hat velocities, $\hat{u}_i$ and $\hat{v}_i$ are composed of neighbor nodal velocities $u_j$ and contain no pressure component. It should be understood that while the illustrated embodiment of the present invention is applied to a two-dimensional flow, the method is applicable to one- and three-dimensional flows.

(d) Compute nodal hat velocities $\hat{u}_i$, $\hat{v}_i$, 104.

In 104, the coefficient matrix $a_{ij}$ is first calculated from the estimated velocity field provided initially. Using these newly calculated values of the coefficient matrix and the nodal velocity values, $u_j$ and $v_j$, from the neighboring sub-control volumes, the nodal hat velocities, $\hat{u}_i$ and $\hat{v}_i$, are computed.

(e) Compute the Gauss Point Hat Velocities and Gauss Point Coefficient, 105

In 105, the gauss point hat velocity $\hat{u}_g$, $\hat{v}_g$ and the gauss point coefficient term $K_g$ are defined as the average value of their nodal counterparts, as provided by the following equations (16)–(18):

$$\hat{u}_g = \frac{1}{N_e} \sum_{j=1}^{N_e} \hat{u}_j, \quad (16)$$

$$\hat{v}_g = \frac{1}{N_e} \sum_{j=1}^{N_e} \hat{v}_j, \quad (17)$$

and $$K_g = \frac{1}{N_e} \sum_{j=1}^{N_e} K_j \quad (18)$$

and the gauss point velocities are expressed as:

$$u_g = \hat{u}_g - K_g \frac{\partial P}{\partial x} \quad (19)$$

$$v_g = \hat{v}_g - K_g \frac{\partial P}{\partial y} \quad (20)$$

In this expression for the gauss point fluxing velocities $u_g$ and $v_g$, the pressure gradients $\partial P/\partial x$, $\partial P/\partial y$ are constant over the fluxing surface. For consistency, the terms $u_g$, $v_g$ and $K_g$ have to be constant over the fluxing surface as well. Traditionally, the interpolation of the gauss point terms would have been computed using the element shape functions, Ni. However, computations involving the shape functions would have given quantities like the gauss point velocities a linear variation across the element, while the pressure gradient is constant over the element. This inconsistency will result in computational schemes that can not conserve mass to machine round-off levels.

(f) Form and Solve the Poisson Pressure Equation, 106.

In 106, by inserting the expression for the gauss point fluxing velocities $u_g$ and $v_g$ into the continuity equation (21), $$\frac{\partial u}{\partial x} + \frac{\partial v}{\partial y} = 0 \quad (21)$$

a Poisson equation for pressure is obtained. The Poisson pressure equation (22) is expressed as:

$$\nabla k \nabla p = \frac{\partial \hat{u}}{\partial x} + \frac{\partial \hat{v}}{\partial y} \quad (22)$$

Integrating this equation over an area A, the fluxing surface of the element, the pressure field can be expressed as:

$$\int_A \nabla k \nabla P dA = \int_A \left[ \frac{\partial \hat{u}}{\partial x} + \frac{\partial \hat{v}}{\partial y} \right] dA \quad (23)$$

Using Green's theorem, these area integrals are converted to line integrals, as represented by the following equation (24):

$$\int_\sigma \left[ k_g \frac{\partial P}{\partial x} \right] dy + \left[ k_g \frac{\partial P}{\partial x} \right] dx = \int_\sigma \hat{u}_g dy - \hat{v}_g dx \quad (24)$$

where σ is the line path. Using the gauss point hat velocities and gauss point coefficient, $\hat{u}_g$, $\hat{v}_g$, and $k_g$ previously calculated in 105, the Poisson pressure equation can be assembled and solved to determine the pressure field. While it is preferred that the area integrals is converted into line integrals before the pressure field expression (23) is solved, other methods which solve the original area integrals, e.g. using a Galerkin formulation, may be used.

(g) Update Velocity Field, 107.

The nodal velocities, $u_i$ and $v_i$ and the gauss point velocities, $u_g$ and $v_g$, are computed by inserting the newly derived pressure field and $\hat{u}_i$, $\hat{v}_i$, $K_i$, $\hat{u}_g$, $\hat{v}_g$, and $K_g$ in the momentum equations.

The discretization equations for other variables, e.g. temperature, are solved using the update velocity field if they influence the flow field. If a particular variable does not influence the flow field, it is preferable to calculate it after a converged solution for the flow field has been obtained.

(h) Check for the Velocity Converging, 108.

In 108, an iterative process is said to have converged when further iterations will not improve the accuracy of the dependent variables. In practice, the iterative process is terminated when the desired accuracy is obtained. Although the computed velocity field at the gauss points conserves mass to machine (computation device) round-off limits at every iteration, the momentum equations are non-linear and therefore iterations are required to refine the momentum balance. In this technique, the flow equations are iterative solved until all velocity values converge to a user supplied tolerance. Numerical tests have revealed that the above algorithm, converges rapidly for highly viscous flows. When lower Reynolds numbers are encountered, solving the momentum equations as a complete equation set can aid in obtaining a more rapid convergence. While the above convergence criterion was chosen for the illustrated embodiment, other convergence criteria may be used without deviating from the spirit of the present invention.

If the velocity fields have not converged, then return to 103 of forming the momentum equations using the updated velocity field. If the velocity field has converged, the method is completed.

As a result of making the conservation of mass and momentum equations consistent at the element level, the predicted gauss point fluxing velocity field does indeed conserve mass to machine round-off levels.

Furthermore, pressure checker-boarding is eliminated, because the gauss point fluxing vector field is centered between the pressures defined at the nodes. Because these vectors are constant within an element, the right number of degrees of freedom is ensured, guaranteeing a unique solution to pressure and velocity.

It should be understood that the present invention of using gauss point velocity and pressure fields to improve accuracy and computation efficiency in solving the coupled mass and momentum equation is not limited to the methodology illustrated; it is applicable to other discretized forms of the momentum equations derived by other formulation, e.g. Galerkin's method or Newton-Raphson's method. In addition, the present invention is also applicable to methods which solve the equation implicitly, e.g. the penalty function method.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A numerical method operating within a processor environment for solving the momentum equation in a computer simulation of a viscous, incompressible, laminar flow within a flow domain comprising:
   (a) discretizing said flow domain into a mesh of elements having nodes and fluxing surfaces;
   (b) forming momentum equations;
   (c) computing nodal hat velocities at each said node;
   (d) calculating gauss point hat velocities and gauss point coefficient, wherein said gauss point hat velocities and gauss point coefficient are average value of nodal hat velocities and nodal coefficient;
   (e) updating velocity field;
   (f) checking if velocity field has converged, and returning to said forming momentum equation if said velocity field has not converged.

2. The method of claim 1, wherein said forming momentum equation includes inputting matrix of said mesh, and initial values of variable parametes.

3. The method of claim 2, wherein said forming of momentum equations includes selecting terms for said momentum equation, integrating said terms over a subcontrol volume, and assembling said terms to form global momentum equations represented as follows:

$$\sum_{j=1}^{N} a_{ij} u_j = -\int_A \frac{\partial P}{\partial x} dA$$

$$\sum_{j=1}^{N} a_{ij} v_j = -\int_A \frac{\partial P}{\partial y} dA$$

and wherein said global momentum equations each including pressure gradient within an area integral.

4. The method of claim 3, wherein said forming momentum equations further includes recasting said global momentum equations, after pulling said pressure gradients outside said area integral, as follows:

$$u_i = \hat{u}_i - K_i \frac{\partial P}{\partial x} \text{ and } v_i = \hat{v}_i - K_i \frac{\partial P}{\partial y}$$

where, $$K_i = \frac{1}{a_{ii}} \int dA,$$

$$\hat{u}_i = -\frac{1}{a_{ii}} \sum_{i \neq j} a_{ij} u_j,$$

and $$\hat{v}_i = -\frac{1}{a_{ii}} \sum_{i \neq j} a_{ij} v_j.$$

5. The method of claim 4, wherein said calculating gauss point hat velocities and gauss point coefficient further includes expressing gauss point velocities, $u_g$, $v_g$, as:

$$u_g = \hat{u}_g - K_g \frac{\partial P}{\partial x} \text{ and } v_g = \hat{v}_g - K_g \frac{\partial P}{\partial y}$$

wherein said gauss point hat velocities $\hat{u}_g$ and $\hat{v}_g$, and gauss point coefficient $K_g$ are element average quantities, such that:

$$\hat{u}_g = \frac{1}{N_e} \sum_{j=1}^{N_e} \hat{u}_j, \hat{v}_g = \frac{1}{N_e} \sum_{j=1}^{N_e} \hat{v}_j, K_g = \frac{1}{N_e} \sum_{j=1}^{N_e} K_j.$$

6. The method of claim 5, wherein said pressure gradients, $\partial P/\partial x$ and $\partial P/\partial y$ in said gauss point velocity expression are constant over an fluxing surface of an element, and said gauss point velocities, $u_g$, $v_g$, and gauss point coefficient $K_g$ are constant over said fluxing surface of said element.

7. The method of claim 6, wherein said updating velocity field further includes forming a Poisson pressure equation, solving said Poisson pressure equation for a gauss point pressure field.

8. The method of claim 7, wherein said forming a Poisson pressure equation further includes inserting the expression for said gauss point fluxing velocities, $u_g$, $v_g$, into a continuity equation and expressing said Poisson pressure equation as:

$$\nabla k \nabla p = \frac{\partial \hat{u}}{\partial x} + \frac{\partial \hat{v}}{\partial y}.$$

9. The method of claim 8, wherein said solving said Poisson pressure equation for a gauss point pressure further includes integrating said Poisson equation over an area of said fluxing surfaces of said elements, and forming said pressure field represented as:

$$\int_A \nabla k \nabla P \, dA = \int_A \left[ \frac{\partial \hat{u}}{\partial x} + \frac{\partial \hat{v}}{\partial y} \right] dA.$$

10. The method of claim 9, wherein said solving said Poisson pressure equation further includes converting area integrals in said pressure field to line integrals via Green's theorem, and represented as:

$$\int_\sigma \left[ k_g \frac{\partial P}{\partial x} \right] dy + \left[ k_g \frac{\partial P}{\partial x} \right] dx = \int_\sigma \hat{u}_g dy - \hat{v}_g dx.$$

11. A method, comprising:
providing a mesh of a flow domain of a fluid flow, the mesh including a number of finite elements with corresponding nodes;
determining a number of momentum equilibrium equations, the equations each being determined as a function of pressure and velocity at a corresponding one of the nodes;
defining velocity at a Gauss-point inside each of the elements to provide a Gauss-point velocity field, and pressure gradient over each of the elements, having the same order as the Gauss-point velocity field;
calculating velocity and pressure at each of the nodes as a function of the Gauss-point velocity field; and
repeating said determining, said defining, and said calculating until a convergence test is satisfied.

12. The method of claim 11 wherein said determining comprises inserting velocities at said Gauss-point inside each of the elements into a continuity equation forming a Poisson pressure equation, and solving said Poisson pressure equation for a pressure field.

13. The method of claim 12, further comprising determining a velocity field as a function of the pressure field.

14. The method of claim 11, wherein the finite elements are each of a three-node linear triangle form, and the velocity at the Gauss-point inside each of the elements is an average of velocities defined at three corresponding nodes.

15. A method for simulating a fluid flow within a flow domain, comprising:
(a) defining the flow domain with a mesh of finite elements each having a corresponding number of nodes;
(b) determining momentum relationships based on velocity and pressure defined at each of the nodes of the finite elements;
(c) calculating a Gauss-point velocity inside each of the finite elements, wherein the Gauss-point velocity is computed from the velocity at each of the nodes of a corresponding one of the finite elements;
(d) updating the velocity at each of the nodes as a function of said calculating;
(e) repeating said determining, calculating, and updating until a convergence test is satisfied.

16. The method of claim 15, wherein said mesh is a fixed mesh.

17. The method of claim 15, wherein said finite elements are triangular elements.

18. The method of claim 15, wherein said finite elements are tetrahedral elements.

19. The method of claim 15, which includes determining a pressure field as a function of the Gauss-point velocity inside each of the finite elements.

20. The method of claim 15, which includes operating a computer to perform said defining, determining, calculating, updating, and repeating.

* * * * *